(12) United States Patent
Balandier

(10) Patent No.: US 9,885,636 B2
(45) Date of Patent: Feb. 6, 2018

(54) METHOD AND SYSTEM FOR PREDICTING THE SERVICEABLE LIFE OF A COMPONENT

(71) Applicant: ROLLS-ROYCE PLC, London (GB)

(72) Inventor: Quentin Luc Balandier, Derby (GB)

(73) Assignee: ROLLS-ROYCE plc, London (GB)

( * ) Notice: Subject to any disclaimer, the term of this patent is extended or adjusted under 35 U.S.C. 154(b) by 260 days.

(21) Appl. No.: 14/601,889

(22) Filed: Jan. 21, 2015

(65) Prior Publication Data

US 2015/0233789 A1 Aug. 20, 2015

(30) Foreign Application Priority Data

Feb. 14, 2014 (GB) .................................. 1402597.7

(51) Int. Cl.
*G01M 15/14* (2006.01)

(52) U.S. Cl.
CPC .................................. *G01M 15/14* (2013.01)

(58) Field of Classification Search
CPC ......... F01D 21/003; G01N 2203/0071; G01M 15/14
USPC ..................................................... 73/112.01
See application file for complete search history.

(56) References Cited

U.S. PATENT DOCUMENTS

| | | | |
|---|---|---|---|
| 5,520,055 A | 5/1996 | Fussinger | |
| 6,289,739 B1 * | 9/2001 | Fujimoto | G01M 5/0033 73/799 |
| 6,568,254 B2 * | 5/2003 | Pross | G01N 3/062 73/112.01 |
| 6,578,430 B1 * | 6/2003 | Duerr | G01L 5/00 73/787 |
| 7,493,809 B1 * | 2/2009 | Ward, Jr. | G01M 5/0016 73/168 |
| 7,568,886 B2 * | 8/2009 | Hohmann | F01D 21/00 416/2 |
| 8,694,269 B2 * | 4/2014 | Mathews | G01M 5/0033 702/35 |
| 8,746,049 B2 * | 6/2014 | Willett, Jr. | G01B 21/02 702/184 |
| 8,784,056 B2 * | 7/2014 | Willett, Jr. | F01D 21/003 415/118 |

(Continued)

FOREIGN PATENT DOCUMENTS

| | | |
|---|---|---|
| EP | 1857637 A2 | 11/2007 |
| EP | 2711679 A2 | 3/2014 |

OTHER PUBLICATIONS

Jul. 9, 2015 Extended Search Report issued in European Application No. 15151772.9.

(Continued)

*Primary Examiner* — Freddie Kirkland, III
(74) *Attorney, Agent, or Firm* — Oliff PLC

(57) ABSTRACT

The remaining serviceable life of a critical rotating component of a gas turbine engine can be predicted using a remote detection component. The remote detection component is inspected to determine whether a crack has formed at a dedicated crack-initiation feature. If a crack has formed, a known correlation between the remote detection component and the critical rotating component is used to estimate the remaining serviceable life of the critical rotating component. Because the detection component is remote from the critical component, there is no risk of failure of the critical component.

13 Claims, 6 Drawing Sheets

(56) References Cited

U.S. PATENT DOCUMENTS

| | | | |
|---|---|---|---|
| 9,103,741 B2 * | 8/2015 | Baik | G01M 5/0016 |
| 2002/0019708 A1 | 2/2002 | Pross | |
| 2007/0095138 A1 | 5/2007 | El-Bakry et al. | |
| 2008/0145223 A1 | 6/2008 | Hohmann et al. | |
| 2010/0094566 A1 * | 4/2010 | Grant | G01M 5/0016 |
| | | | 702/38 |
| 2012/0294704 A1 | 11/2012 | Willett, Jr. | |
| 2014/0076060 A1 * | 3/2014 | Balandier | G01M 5/0016 |
| | | | 73/785 |

OTHER PUBLICATIONS

Aug. 12, 2014 Search Report issued in British Application No. GB1402597.7.

* cited by examiner

METHOD AND SYSTEM FOR PREDICTING THE SERVICEABLE LIFE OF A COMPONENT

CROSS-REFERENCE TO RELATED APPLICATIONS

This application is based upon and claims the benefit of priority from British Patent Application Number 1402597.7 filed 14 Feb. 2014, the entire contents of which are incorporated by reference.

BACKGROUND

1. Field of the Disclosure

The present disclosure relates to a method and apparatus for predicting the serviceable life of a component subjected to service loading and a system for performing such predictive analysis. Examples of the disclosure relate to a method and system for predicting the serviceable life of components of a gas turbine engine.

Critical component parts for aircraft gas turbine engines, whose failure could hazard the operation of the engine and/or the airframe to which it is attached, are monitored at regular intervals and are generally replaced when they reach a fixed service life to avoid any failure or dysfunction in service. This life limit is termed the Declared Safe Cyclic Life (DSCL). This replacement is undertaken irrespective of the serviceability of the component part when it reaches the DSCL.

The in-service loading of aircraft gas turbine components includes a variety of stress mechanisms including complex three-dimensional stress fields, low cycle fatigue, high cycle fatigue, elasto-plastic loading, creep, oxidation and erosion.

The levels of stress experienced by such components can vary widely across the different parts of the flight cycle, e.g. taxiing, take-off, cruise and landing. Furthermore, the stress levels may vary depending on the specific engine and/or aeroplane and/or operator. For example, some routes and/or operators may operate at generally higher thrust than others, some pilots may use the engines differently, and different routes may experience different climatic conditions (for example temperature/air pressure/air density at take-off, landing or cruise). By way of further example, different operators may use the engine with different specific conditions (for example different usage of throttle movements during landing or climb, different mission length with different time exposure at elevated temperature) leading to complex loading spectra of the components. Those complex loading conditions can lead to different levels of damage within the component.

In addition to the various operational factors listed above, the material properties of a component (such as ultimate strength, proof strength, fatigue and creep strength) can vary with a large scatter, for example from batch to batch, leading to different lives for nominally the same components operating under the same conditions.

Due to these various operational and/or component factors, such as those listed above, it is difficult to predict a serviceable life limit for individual component parts.

As a result, the DSCL for a component part is determined on a conservative basis. A conservative flight profile (for example in terms of engine speed, cruise, take-off and landing conditions) is assumed, i.e. one in which the component would be subjected to relatively high damage. A statistical estimation is then used on the basis that the component has the worst physical (such as material) properties out of a certain number, for example the worst properties out of a sample of 1000 components. This is illustrated by way of example in FIG. 1.

Consequently, in the above-mentioned example, when the parts reach the DSCL, at least 999 parts from a sample of 1000 parts will be scrapped whilst being un-cracked and/or still serviceable. This approach, while ensuring that the likelihood of parts failing in-service is minimised, does result in the scrappage of a considerable quantity of parts which may have considerable remaining safe working life. This results in costly routine engine overhauls.

2. Description of the Related Art

It is known to routinely inspect component parts of aircraft gas turbine engines at regular intervals in order to determine whether the part is cracked or damaged. A problem with this approach is the need to employ non-destructive testing (NDT) techniques to detect the onset of cracking which could potentially lead to hazardous failure of the component. In addition, waiting until a crack has appeared in a given component may be unsuitable, because once the component is cracked, it may already be unserviceable.

OBJECTS AND SUMMARY

According to an aspect, there is provided a method of predicting a remaining serviceable life of a critical rotating component of a gas turbine engine comprising: providing a detection component in the gas turbine engine with a crack initiation feature (which may be referred to as a stress raising feature), the detection component being remote from the critical rotating component;
inspecting the detection component to determine whether a crack has formed at the crack-initiation feature; and
estimating a remaining serviceable life of the critical rotating component based on whether a crack has formed at the crack-initiation feature.

According to an aspect, there is provided a gas turbine engine comprising:
a critical rotating component that is critical to the operation of the gas turbine engine;
a detection component that is provided with a crack initiation feature and is remote from the critical rotating component, wherein:
the crack initiation feature is arranged such that, in use, formation of a crack at the crack initiation feature is correlated to the remaining serviceable life of the critical rotating component.

Formation of a crack at the crack initiation feature may allow an estimation to be made of the remaining serviceable life of the gas turbine engine.

The crack-status of the detection component (i.e. whether a crack has formed therein) may be said to be correlated to the remaining serviceable life of the critical rotating component. A crack may form in the detection component before the end of the serviceable life of the critical rotating component.

Failure or loss of integrity of the critical rotating component may be hazardous to the operation of the gas turbine engine and/or to an airframe to which the engine is attached. Cracking of the detection component may not be hazardous and/or critical to the operation of the gas turbine engine or an associated airframe.

The methods and apparatus disclosed herein may allow more accurate prediction of the remaining serviceable life of a critical component of a gas turbine engine. The separate (or remote) detection component may be more accessible than the component whose remaining service life is being estimated. Cracking of the detection component (for example due to fatigue) may not affect the operation of the component whose remaining life is being estimated and/or may not affect the operation of any other part of gas turbine engine. As such, the methods and apparatus disclosed herein for estimating the remaining serviceable life of a critical component may not have any detrimental impact on the integrity or life of the critical component itself, and may thus be considered to be entirely safe.

Generally, a crack may form in the detection component due to fatigue, for example low cycle fatigue. By way of example, the fatigue life of a critical component may be estimated from crack formation in the detection component.

The methods and apparatus disclosed herein may mean that critical components remain in safe service for longer periods than would be the case if conventional techniques were used for estimating their life. The detection component may effectively allow a direct record of the loading/operating history of the critical component. The estimation of a remaining life of a component may be based on its operational life, for example, thereby allowing the life (for example remaining life) of each individual critical component to be estimated more accurately. Additionally or alternatively, the methods and apparatus of the present disclosure may allow the detection of premature damage to critical components, for example through fatigue. This may enhance the reliability and/or safety of such components.

The detection component may be said to have a perimeter edge, and a crack may be determined to have formed at the crack-initiation feature only if the crack extends from the crack initiation feature to the perimeter edge. This may allow a straightforward, reliable and/or repeatable determination of whether a crack has formed. Additionally or alternatively, a crack may be determined to have formed if it has at least a minimum length.

The detection component may be provided with first and second crack initiation features. The first and second crack initiation features may be provided at respective first and second distances from a perimeter edge of the detection component. The first distance may be less than the second distance. A first estimation of remaining serviceable life of the critical component may be based on crack formation at the first crack initiation feature. A second estimation of remaining serviceable life of the critical component may be based on crack formation at the second crack initiation feature.

Providing more than one crack initiation feature (which may be referred to as a crack initiation site) may allow the remaining serviceable life of the critical component to be estimated with particularly high accuracy. The detection component may be arranged such that a first crack forms at a first crack initiation feature before a second crack forms at a second crack initiation feature. This may allow an early indication of the remaining serviceable life of the critical component (from the appearance of first crack), as well as a more accurate estimation closer to the limit of the serviceable life (from the appearance of second crack)

The detection component may comprise a plurality of crack initiation features. The crack initiation features may be provided at respective distances from a perimeter edge of the detection component, for example with a least two of respective distances being different to each other. This may allow a plurality of respective estimations of remaining serviceable life of the critical component to be made based on crack formation at each of the crack initiation features.

If a crack is detected in the detection component, the estimated remaining serviceable life of the critical rotating component may then be directly known. In this regard, it may be necessary to assume that the crack appeared in the detection component immediately after a directly previous inspection of the detection component. A predetermined estimated remaining serviceable life may mean that the remaining serviceable life is estimated to be or include a number of rotational cycles (or revolutions) of the gas turbine engine and/or a number of flight cycles, including take-off, cruise, and landing, for example.

A correlation between the crack status of the detection component and the remaining serviceable life of the critical rotating component may be established prior to the step of inspecting the detection component. For example, the correlation may be established through prior testing. Such prior testing may include, for example testing the additional use (for example in terms of engine rotational cycles and/or flight cycles) between when a crack forms in the detection component and when the critical rotating component is compromised (for example when it fails, for example through crack formation).

Additionally or alternatively the correlation between crack formation in the detection component and the remaining serviceable life of the critical rotating component may comprise consideration of at least one of:
the geometry of the detection component, the geometry of the or each crack initiation feature and the geometry of the critical rotating component;
the location of the detection component and the location of the critical rotating component in the gas turbine engine; and
the material of the detection component and the material of the critical rotating component.

For example, the geometry of the detection component may be such that the stress (which may be a non-dimensional stress, such as the stress divided by the proof stress of the component), for example the maximum stress, generated in the detection component in use is a known amount higher than that generated in the critical rotating component. This increased stress may be generated at the crack initiation feature. The increased stress may be known as an "overstress". This overstress may be related to a reduced life (for example reduced number of cycles of the gas turbine engine, e.g. in terms of engine rotations and/or flight cycles) through known material properties, for example.

The remaining serviceable life of a critical rotating component may be estimated on a number of different occasions through the life of the component. The occasions may correspond to servicing of the gas turbine engine. According to an aspect, there is provided a method of predicting a remaining serviceable life of a critical rotating component as described herein, wherein the steps of inspecting the detection component and estimating a remaining serviceable life of the critical rotating component are performed at predetermined intervals. Such predetermined intervals may correspond to engine service intervals, for example.

Such predetermined intervals may be based on the use of the engine, for example on the number of rotational cycles (or revolutions) of the engine and/or the number of flight cycles, including take-off, cruise and landing.

The detection component may be constructed and arranged to remain as a single unit in the event of crack formation at one or more crack initiation features. As such, crack formation at the crack initiation feature may not result in failure of the detection component. Such failure may be defined as, for example, breaking or fracturing of the component into at least two parts. A crack formed in the detection component may be referred to as a non-dysfunctional crack. The term "non-dysfunctional crack" may be used to refer to a crack that can propagate without failure of the component. A crack formed in the detection component may be sufficiently small relative to the size of the detection component itself that the function and/or operation of the detection component remains substantially unaffected by the presence of a crack, for example with no unwanted imbalance or vibration.

The detection component may be arranged such that even if it were to fail, its failure is not critical to the operation of the gas turbine engine. For example, the sole purpose of the detection component may be for use in estimating the remaining serviceable life of the critical rotating component. Such a detection component may be referred to as a sacrificial detection component.

The detection component may be a stationary (that is non-rotating) component of the gas turbine engine. A gas turbine engine according to the present disclosure may define a core flow path. Flow through the core flow path may pass through the combustor of the gas turbine engine in use. The detection component may be a stationary component placed in core flow path. Purely by way of example only, the detection component may be a stationary vane having a platform and an aerofoil portion. The crack-initiation feature may be provided on the platform. Again by way of example only, the stationary vane may be a nozzle guide vane, for example a guide vane that is immediately downstream of the combustor.

According to such an arrangement, crack formation in a static detection component may be correlated to the life of a rotating component. For example, if the detection component is static, then the stress that it experiences in use, and thus its crack status at a given time, may in general be correlated to the pressures and temperatures that it experiences during use. The stress experienced by a rotating component, and thus its remaining life at a given time, may be a function of the rotational speed, as well as the pressures and temperatures that it experiences. However, in general in a gas turbine engine, pressure and temperature are generally a function of the rotational speed of the engine (higher shaft speeds generally corresponding to higher temperatures and pressures). Accordingly, the stress history of a static component in a gas turbine engine (for example one that is in the gas-flow path) is highly correlated to the stress history of a rotating component in the same gas turbine engine. Such stress histories may include, for example, high stress at take off, which reduces during the climb phase of a flight, is static during cruise, and then has high stress spikes during landing, for example during a thrust reverse cycle.

Of course, the detection component may itself be a rotating component. For example, the detection component may rotate at the same speed as the critical rotating component. For example, the detection component and the critical rotating component may be part of or may be connected to the same shaft of a gas turbine engine. Alternatively, the detection component and the critical rotating component may rotate at different speeds, for example by being connected to different shafts. A rotating detection component may or may not be provided in a gas flow path (for example a core gas flow path) of the gas turbine engine.

Purely by way of example, the detection component may be a rotating blade having a platform and an aerofoil portion. In such an arrangement, the crack initiation feature may be provided on the platform.

By way of further example, the detection component may be a disc connected to a rotating shaft of the gas turbine engine. Such a disc may be a dedicated detection component, whose sole function is for use in estimating the life of a critical component, for example by providing one or more crack initiation features. Such a disc may be located in the engine in a position that has substantially no impact on gas flow through the engine. Such a disc (which may be referred to as a detection disc, or a mini-disc) may be placed in a location that is not in the gas flow path of the engine.

The detection component and the critical rotating component may be manufactured as different component parts of a single forging, for example. The reduced life of the detection component may then be determined from the overstress simply through known material properties.

The detection component and the critical component may be manufactured using the same material, but from a different forging and/or different method of manufacture. In that case, a correction factor, which may be or include a safety factor, may be applied when calculating the reduced life of the detection component from the overstress to account for the different method of manufacture and/or (possibly unknown) variations in the different forgings.

The detection component may be manufactured from a different material to the critical rotating component. In that case, a correction factor, which may be or include a safety factor, may be applied when calculating the reduced life of the detection component from the overstress to account for the different material properties.

A correlation between crack formation in the detection component and the remaining serviceable life of the critical rotating component may be stored on a computer readable medium and/or the estimation of the remaining serviceable life may be performed on a computer.

More than one detection component may be provided to a gas turbine engine. More than one detection component may be inspected according to methods of the present disclosure. More than one detection component may be used to predict the remaining serviceable life of a single critical rotating part. This may provide a particularly accurate estimate of the remaining serviceable life of the critical rotating part.

Throughout the present disclosure, the critical rotating component may be any suitable component for which an estimation of the remaining service life is desired. By way of non-limitative example, the critical rotating component may be a rotating shaft (for example a rotating compressor and/or turbine shaft), or a turbine or compressor disc. Such a rotating disc may carry rotating blades of the gas turbine engine. Such blades may be integral to the disc (for example in the form of a bladed disk ("blisk") or bladed ring ("bling"), or may be separate component that are attached to the disc via root portions.

The crack initiation feature may provide a site at which a crack forms in the detection component after a repeatable stress exposure (or stress history) of the detection component. By way of non-limitative example, the crack initiation feature may be a hole, a notch, a groove, a boss, or a flange or a slot, such as a slot that is provided in standard specimens for measuring crack formation/propagation.

The crack initiation feature may extend entirely through the detection component. Alternatively, the crack initiation feature may not extend entirely through the detection component. Where the crack initiation feature is provided in a component that may be in a gas flow path, providing a crack initiation feature that does not extend entirely through the detection component may help to reduce, or substantially eliminate any impact on the gas flow.

Inspecting a detection component may comprise performing a visual inspection. Thus, the detection component may be visually inspected to determine whether a crack has formed. Additionally or alternatively, the inspection of the detection component may be undertaken by any convenient inspection method. This may include ultrasonic, x-ray analysis, fluoro-penetrant dye inspection and/or boroscope inspection.

The detection component may be accessible (for example for inspection) in-situ, for example without the need to dismantle the gas turbine engine. The detection component may be said to be more accessible than the critical component whose remaining serviceable life is being estimated. This may mean that access (for example for inspection) to the detection component is easier and/or less time consuming than access to the component whose remaining serviceable life is being estimated. Access to the detection component may be through a boroscope hole, which may be an existing boroscope hole use for other inspection purposes in the gas turbine engine, for example. As such, a gas turbine engine according to an aspect may comprise an access feature arranged to allow access to the detection component. Such an access feature, which may be a boroscope hole, may enable inspection of the detection component in-situ, for example without the need to dismantle the engine.

BRIEF DESCRIPTION OF THE DRAWINGS

Examples of the disclosure will now be described, by way of non-limiting example only, with reference to the accompanying drawings, in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF EMBODIMENTS

Figure 1:
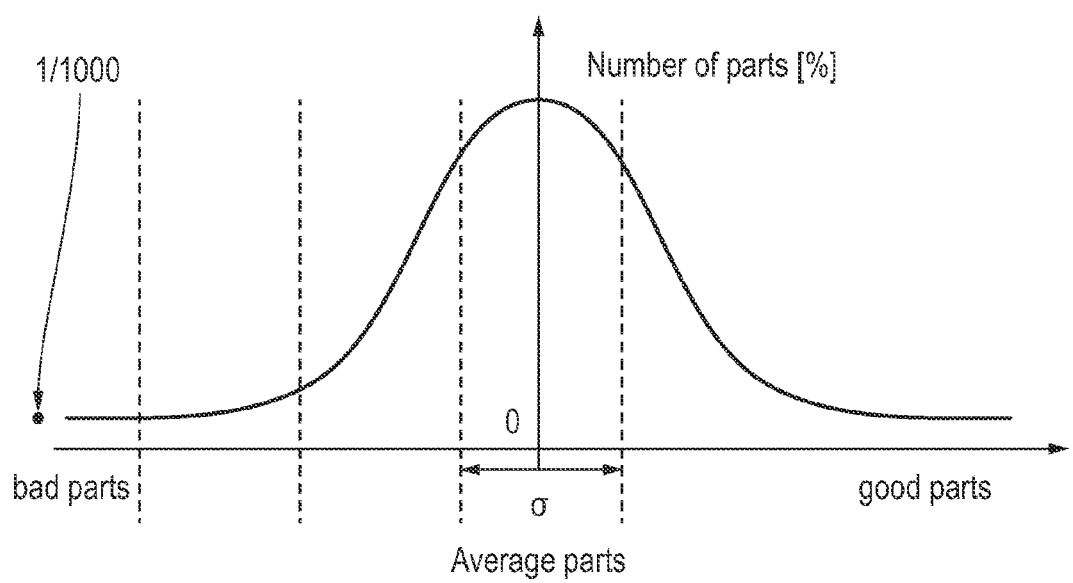
FIG. 1 shows a typical distribution of serviceable life for a typical component for a gas turbine engine.
Figure 2:
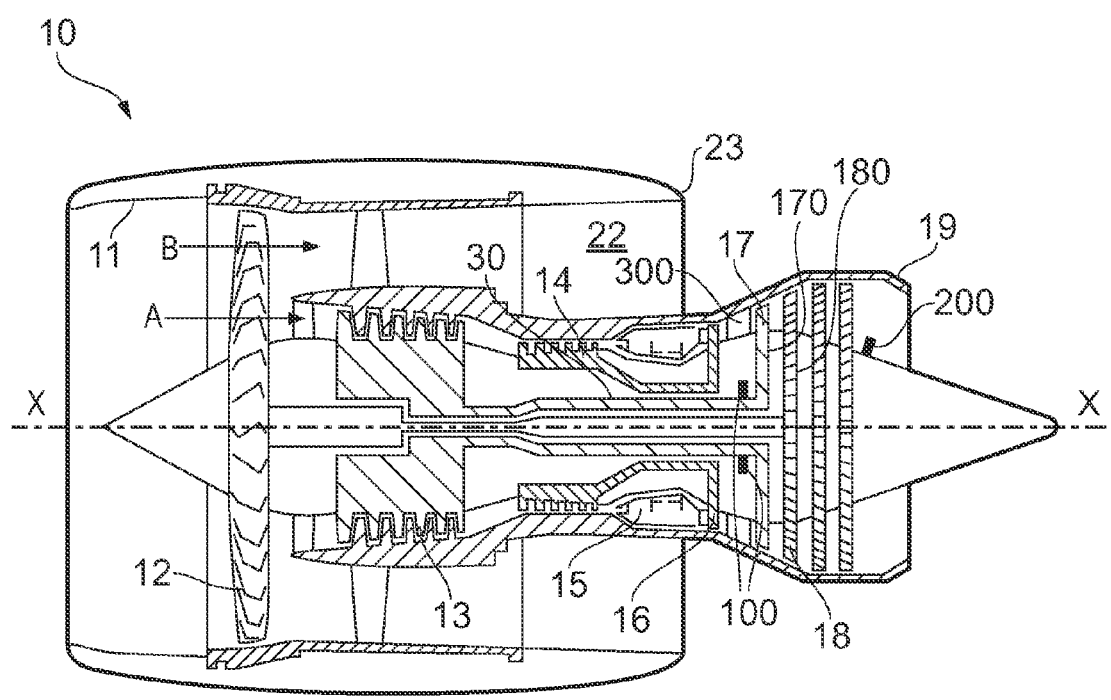
FIG. 2 is a cross-section through a gas turbine engine having detection components, according to examples of the invention.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

As described above, the life of various components of the gas turbine engine 10 may be critical to its operation. For example, each of the turbine stages 16, 17, 18 and each of the compressor stages 12, 13, 14 comprises aerofoil components that are attached to a rotating disc (such as the turbine discs labelled 170, 180 in FIG. 2), and the rotating disc may be deemed to be critical to the operation of the gas turbine engine 10. As such, these rotating discs are examples of critical rotating components for which accurate estimation of the remaining serviceable life is advantageous.

To this end, the gas turbine engine 10 is provided with detection components 100, 200, 300, as shown in FIG. 2. It will be appreciated that, whilst the gas turbine engine of FIG. 2 is shown as comprising three separate detection components 100, 200, 300, any one or more than one such detection components 100, 200, 300 may be provided.

A gas turbine engine 10 may comprise a rotating detection component 100, as in the example shown in FIG. 2 in which a rotating detection component 100 is fixedly attached to (for example mounted to or mounted on) a rotating shaft 30. The rotating detection component 100 may thus be configured to rotate at the same speed as the shaft 30 during use. The rotating shaft 30 may also have at least one turbine and/or compressor rotor stage mounted thereon. The rotating detection component 100 may be used to predict the remaining serviceable life of a component that rotates at the same speed (for example a rotating component, such as a turbine disc 170, that is attached to the same shaft 30), or at a different speed (for example a rotating component, such as a turbine disc 180, that is attached to a different rotating shaft). The difference in shaft rotational speeds (for example between high pressure, low pressure and (where present) intermediate pressure shaft speeds) may be well known, for example from engine performance modelling, so the detection component 100 and the critical component 170, 180 may or may not be attached to the same shaft. The rotating detection component 100 may itself be a disc or other feature that rotates with the shaft 30 in use. In some arrangements, the sole purpose of the rotating detection component 100 may be in predicting the remaining serviceable life of a critical rotating component 170, 180.

A stationary detection component 200, 300 may be provided in addition to or instead of the rotating detection component 100. In the FIG. 2 example, two stationary detection components 200, 300 are provided. One of the detection components 200 is a dedicated detection component 200. The sole function of the dedicated detection component 200 may be in predicting the remaining serviceable life of a critical rotating component 170, 180. Indeed, any detection component 100, 200, 300—stationary or rotating—may be a dedicated detection component 200.

Alternatively, any detection component 100, 200, 300 may perform another function in additional to its use in predicting the remaining serviceable life of another component. For example, a stationary detection component may be a guide vane, such as the guide vane that forms the stationary detection component 300 in the FIG. 2 example. By way of example, a crack initiation feature (described in greater detail by way of example below) may be provided on a platform of a guide vane, such as a nozzle guide vane immediately downstream of the combustor 15.

As described elsewhere herein, even though a stationary detection component 200, 300 would not rotate with the critical rotating component 170, 180, its service life may still correlate with the service life of a critical rotating component. For example, the stress experienced by the stationary detection component 200, 300 may be mainly a function of the temperature and/or pressure to which it is exposed. But the temperatures and pressures are generally functions of shaft speed in a gas turbine engine 10. Accordingly, the stress experienced by a critical rotating component 170, 180 (which is generally a function of rotational speed, temperature and pressure) in a gas turbine engine 10 may be correlated to the stress experienced by a stationary component 200, 300. The stationary static components 200, 300 may be placed in the airflow A that passes through the core of the gas turbine engine (i.e. through the intermediate and high pressure compressors 13, 14, the combustor 15, and the turbines 16, 17, 18) to provide a particularly accurate correlation between its own life and that of a critical rotating component 170, 180.

Figure 3:
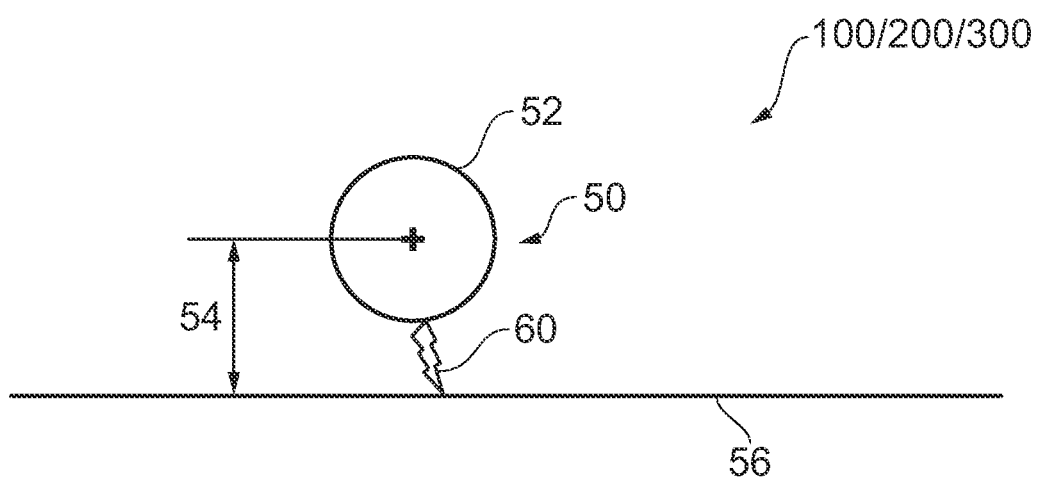
FIG. 3 is a schematic view of a part of a detection component showing a crack initiation feature in more detail.

Each detection component 100, 200, 300 is provided with one or more crack initiation features 50. FIG. 3 shows a detailed view of a part of a detection component 100, 200, 300 including an example of such a crack initiation feature 50. In the FIG. 3 example, the crack initiation feature 50 is provided in the form of a hole 50 in the detection component 100, 200, 300. The hole 50 (or indeed any other crack initiation feature 50) may extend through the detection component 100, 200, 300, or may only extend partly into the detection component 100, 200, 300.

The crack initiation feature 50 is located a pre-determined distance 54 from a free edge (or perimeter edge) 56 of the detection component 100, 200, 300. The distance 54 is determined such that the resulting stress concentration factor at the hole 50 results in the initiation of a crack 60 after a given period (for example a given number of flight and/or engine cycles) of use of the detection component 100, 200, 300. The crack 60 may be referred to as a non-dysfunctional crack 60, because its formation may not be critical to the operation of the detection component 100, 200, 300 (which may be particularly important where the detection component 100, 200, 300 performs an additional function in the engine, such as a vane) and/or to the operation of the gas turbine engine 10. Due to the relative construction and arrangement of the detection component 100, 200, 300 and the critical rotating component 170, 180, the non-dysfunctional crack 60 forms earlier than any meaningful deterioration (for example any uncontrolled crack formation) in the critical rotating component 170, 180.

The desired size and positioning of the crack initiation feature 50, required to produce a given stress concentration factor for example, may be determined by any known technique, such as by experiment and/or by an analytical modelling technique (such as, for example, finite element analysis). Accordingly, the expected stress concentration at the hole 50 during use may be well known and understood. Accordingly, the appearance of a non-dysfunctional crack 60 in the detection component 100, 200, 300 may be readily correlated to the stress history of the detection component 100, 200, 300. This stress history of the detection component 100, 200, 300 may then be readily correlated to the stress history of a critical rotating component, and thus the remaining serviceable life of that critical rotating component.

In use, the detection component(s) 100, 200, 300 may be inspected for the appearance of a crack 60 at the crack initiation feature 50, at pre-determined intervals. For example, the intervals may correspond to service intervals, which may be determined in any suitable manner, for example on the basis of the number of hours for which the gas turbine engine 10 has been in operation and/or the number of cycles of the engine. The inspection may take any suitable form such as, for example, a visual inspection. Purely by way of example, a boroscope may be used to perform the inspection.

If a crack 60 is detected in the detection component 100, 200, 300, then a known, for example pre-determined, correlation may be applied to estimate a remaining serviceable life of a remote, critical component 170, 180. It may be assumed, for example, that the crack 60 appeared immediately after the previous inspection. This would be a particularly cautious approach, and it will be appreciated that other approaches are possible. For example, it may be possible to estimate from the crack 60 (for example from its size, such as its length) the age of the crack (for example in terms of engine cycles), and thus when the crack 60 formed. This may allow a more accurate estimation of the remaining serviceable life of the critical component 170, 180.

By way of example, one possible approach, which could be applied to any embodiment, is to determine that a crack 60 has formed at the crack initiation feature 50 if and only if the crack 60 extends from the crack initiation feature 50 to a perimeter edge 56 of the detection component 100, 200, 300, as in the FIG. 3 example. This may provide a particularly repeatable technique for determining whether a crack 60 has formed. However, it will be appreciated that other approaches are possible, for example determining whether a crack 60 of any detectable size has formed, or determining whether a crack 60 over a certain size (for example length) has formed.

Figure 4A:
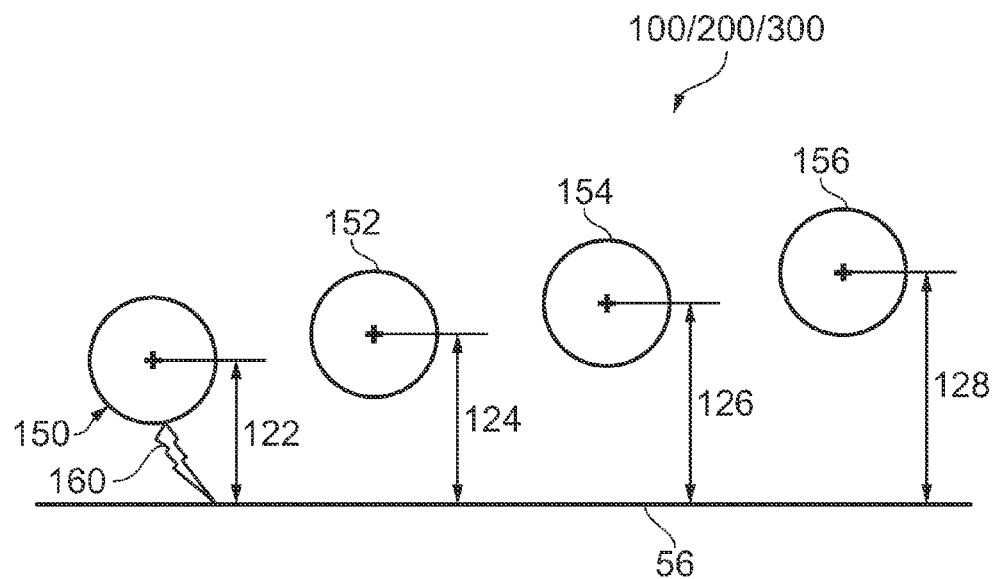
FIG. 4A is a schematic view of a detection component comprising more than one crack initiation feature.
Figure 4B:
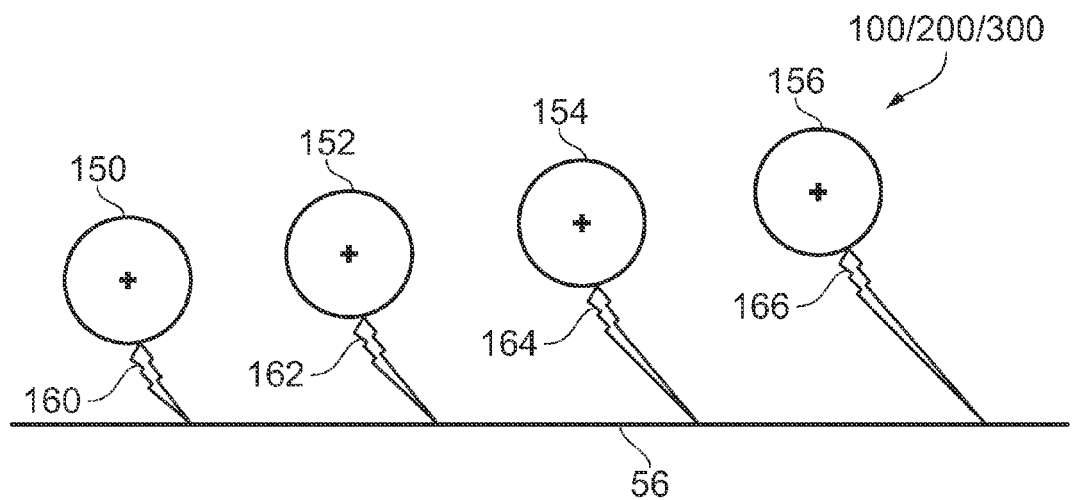
FIG. 4B is a schematic view of the detection component of FIG. 4A with cracks having formed from each of the crack initiation features.

Any one or more detection components 100, 200, 300 may comprise one or more than one crack initiation feature. By way of example, FIGS. 4A and 4B show a portion of a detection component 100, 200, 300 that comprises four crack initiation features 150, 152, 154, 156. Each of the crack initiation features 150, 152, 154, 156 may be substantially as described above in relation to the crack initiation feature 50 of FIG. 3. As such, each of the crack initiation features 150, 152, 154, 156 may be a hole. In alternative arrangements, any one or more of the crack initiation features 150, 152, 154, 156 may take a different form such as, by way of example only, a notch, a groove, a boss, a flange, or a slot, such as would be used in a standard crack test specimen, for example.

The stress concentration may be different for each of the crack initiation features 150, 152, 154, 156. For example, in the arrangement of FIGS. 4A and 4B, each of the plurality of crack initiation features 150, 152, 154, 156 may be positioned a successively greater distance 122, 124, 126, 128 from a perimeter edge 56 of the detection component 100, 200, 300. Accordingly, the stress concentration at each crack initiation feature 150, 152, 154, 156 may successively increase from right to left in the arrangement shown in FIGS. 4A and 4B, as the distance from the respective crack initiation feature 150, 152, 154, 156 to the perimeter edge 56 decreases.

As mentioned in relation to FIG. 3, the expected stress concentration at each crack initiation feature 150, 152, 154, 156 during use may be well known and understood, for example by using a modelling technique such as finite element analysis (FEA) or by experiment. A non-dysfunctional crack 162, 164, 166 originating from the second and subsequent crack initiation features 152, 154, 156 would be designed to form after (for example following a greater number of engine cycles) the formation of a crack originating from a crack initiation feature 150, 152, 154 that has a higher stress concentration in use. That is, the second, third and fourth crack initiation features 152,154,156 may be sized and/or located in the component 100 such that corresponding non-dysfunctional cracks 162,164,166 are initiated following successive periods of operation of the component 100.

Accordingly, the appearance of a non-dysfunctional crack 160 originating at a first crack initiation feature 150 in the detection component 100, 200, 300 may be readily correlated to the stress history of the detection component 100, 200, 300. Similarly, the appearance of non-dysfunctional cracks 162, 164, 166 originating at second and subsequent crack initiation features 152, 154, 156 may also be correlated to the stress history of the detection component.

For the formation of each non-dysfunctional crack, the stress history of the detection component 100, 200, 300 may then be readily correlated to the stress history of a critical rotating component 170, 180, and thus the remaining serviceable life of that critical rotating component 170, 180. Thus, for example, a first estimation of the remaining serviceable life may be estimated after the formation of the first non-dysfunctional crack 160, and subsequent (second, third, fourth and so on) estimations of the remaining serviceable life may be estimated after the formation of subsequent non-dysfunctional cracks from the crack initiation features 152, 154, 156 having successively lower stress concentrations. This may allow a particularly accurate estimation of the remaining serviceable life of a critical component 170, 180, for example by comparing the estimates provided by crack formation at each of the crack initiation features 150, 152, 154, 156. Purely by way of example, the detection component may be arranged such that once a crack 166 is detected at the crack initiation feature 156 having the lowest stress concentration, the critical rotating component 170, 180 may be estimated to have no remaining serviceable life. In such an arrangement, the crack initiation feature 156 with the lowest stress concentration may be a fail-safe feature which indicates that a critical component may need to be replaced immediately.

As mentioned elsewhere herein, the detection component 100, 200, 300 may be either rotating or stationary, and may be provided at any convenient position/location and in any desired manner. The position of the detection component may be chosen based on, for example, ease of access for inspection and/or accuracy of correlation between its own life (for example as determined by crack formation) and that of the critical component 170, 180.

The detection component 100, 200, 300 may be positioned a considerable distance from the critical rotating component 170, 180 whose life is being estimated, and the relationships discussed herein by way of example may be used in order to correlate crack formation in the detection component 100, 200, 300 with the remaining serviceable life of the critical rotating component.

Figure 5:
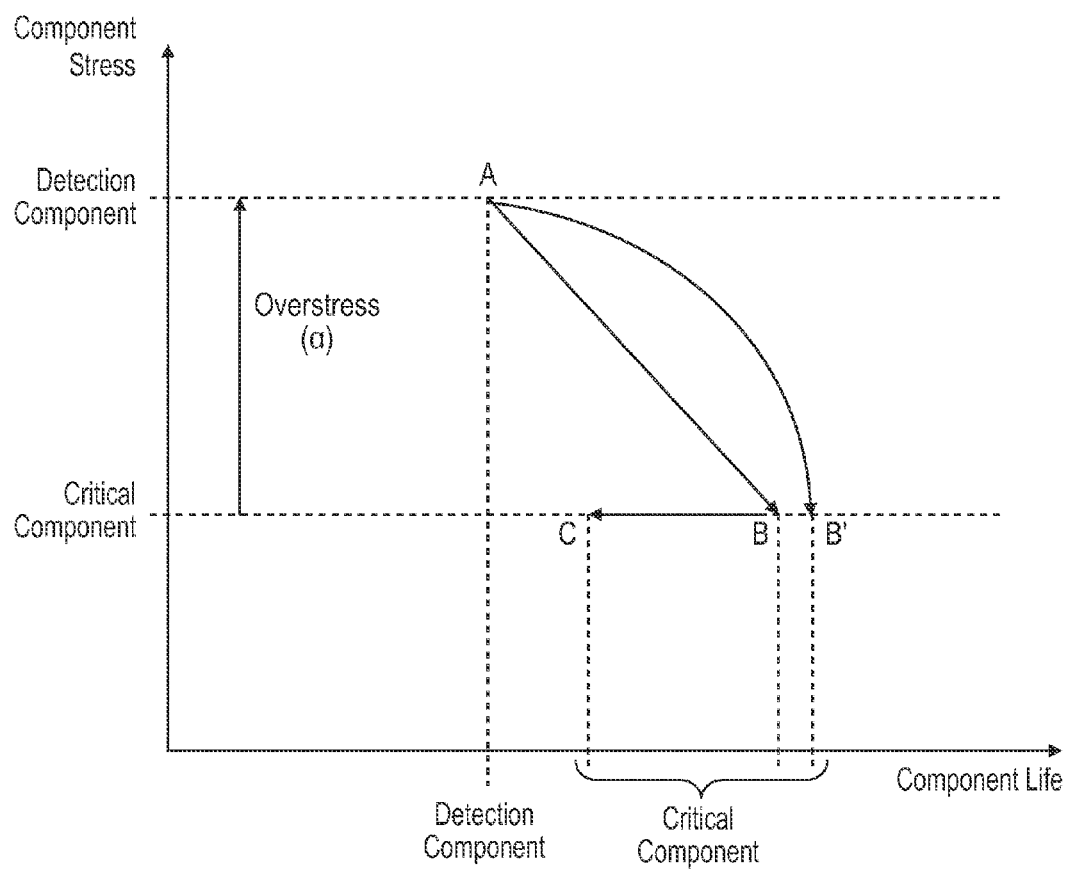
FIG. 5 shows an example relationship between the life of a critical component and the life of a remote detection component.

FIG. 5 is an illustrative example of the correlation between the life (which may be any suitable measure, such as number of cycles) of a detection component 100, 200, 300 and that of a critical component 170, 180. The life of the detection component 100, 200, 300 may be determined as being the point at which a crack 60 appears from a respective crack initiation feature 50 and thus may or may not represent the actual serviceable life of the detection component 100, 200, 300. It will be appreciated that the explanation given below in relation to FIG. 5 is purely by way of an example of how the life of the two components may be related, and that other explanations may be used.

The overstress α in FIG. 5 represents the additional stress experienced by the detection component 100, 200, 300 (for example at a crack initiation feature 50) over that experienced by the critical component 170, 180 in use. This may be known through, for example, experimentation and/or analysis (such as FEA).

If the same material (for example same base material and same manufacturing process) is used for the detection component 100, 200, 300 and the critical component 170, 180, then known material properties may be used to correlate the life of the detection component 100, 200, 300 and the life of the critical component 170, 180. The relationship between stress and life may take any form, depending on the material. For example, for one material, the relationship may be a straight line between the points A (representing life of the detection component 100, 200, 300) and B (representing the estimated life of the lower-stressed critical component 170, 180) in FIG. 5. For a different material the relationship may be a curve, as shown in FIG. 5 between the points A and B'. By way of example, empirical and/or experimental data may be used to generate the relationship between the stress and life for a given material.

In some arrangements a different material may be used for the detection component 100, 200, 300 to that which is used for the critical component 170, 180. In this regard, different material may mean different material properties, and so may include the use of a different base material and/or the use of a different manufacturing process (for example a different forging process where both components are forged). In that case, a correction may be used to account for the different material properties. For example, as shown in FIG. 5, a correction may be used to take the estimated life of the critical component 170, 180 from the point B (at which it would be given the same material properties) to the point C. It will be appreciated that the translation from point B in FIG. 5 to point C may be in either direction (i.e. longer or shorter life), depending on the relative material properties. It will also be appreciated that the estimated life at point C of the critical component 170, 180 may be established directly from point A (the life of the detection component 100, 200, 300) using relative material properties, which may be known, for example, through empirical and/or experimental data.

Even if the same material and manufacturing process are used for the detection component 100, 200, 300 and the critical component 170, 180, if they are manufactured in different batches (for example in physically different forging operations), then a safety margin may be applied. This may effectively shift the estimated life of the critical component 170, 180 to the left in FIG. 5, from point B towards (or to) point C.

Even if the detection component 100, 200, 300 and the critical component 170, 180 are manufactured from the same material, using the same process, and in the same batch, a safety margin may be included when estimating the life of the critical component 170, 180 from that of the detection component 100, 200, 300, thereby effectively shifting the points B and C in FIG. 5 to the left. Using a greater number of detection components 100, 200, 300 and/or crack initiation features 50, 150, 152, 154, 156 may help to increase the confidence in the estimated life of the critical component 170, 180, and may thus allow any safety margin to be reduced.

Figure 6:
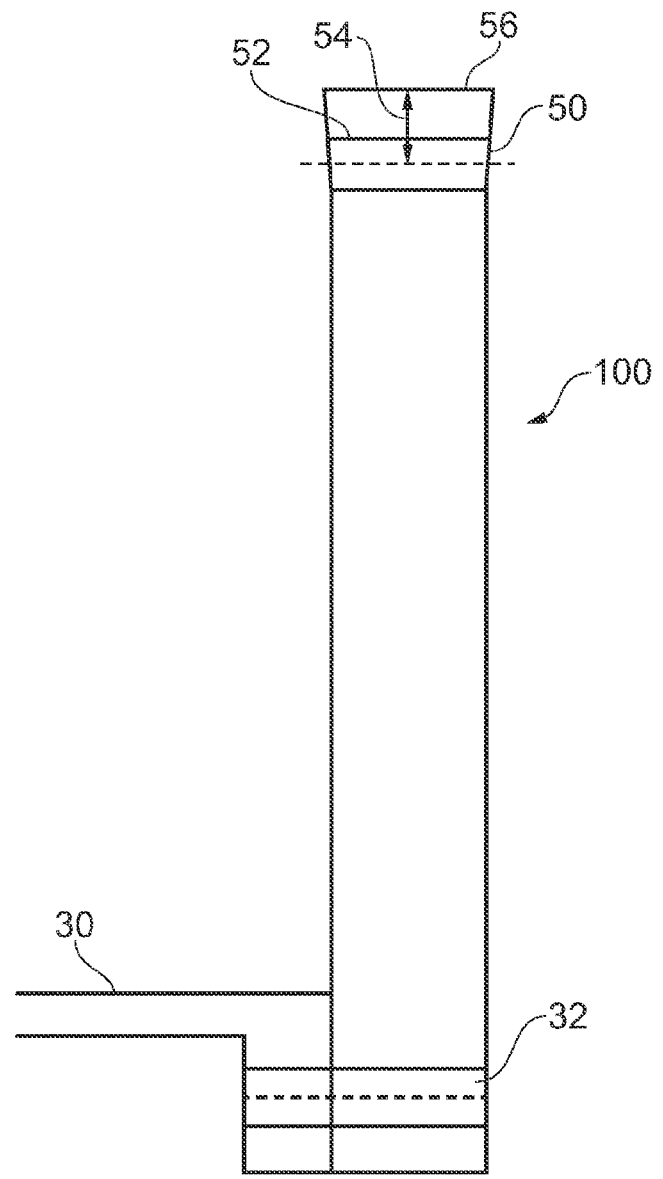
FIG. 6 is a schematic view of an example of a detection component in the form of a disc.

FIG. 6 is a more detailed schematic view of a detection component 100, which may represent, for example, the rotating detection component 100 shown in FIG. 2. The features shown in FIG. 6 that correspond to features described in relation to other figures are given like reference numerals.

In the FIG. 6 arrangement, the detection component 100 may be a rotational component that rotates about an axis X-X, which may correspond to the axis X-X of a gas turbine engine 10. The detection component 100 may have an annular shape when viewed along its rotational axis X-X, and may be referred to as a disc, a detection disc, or a mini-disc. The mass (and/or rotational moment of inertia) of the disc 100 may be less than that of the critical rotating component 170, 180 whose remaining serviceable life it is being used to estimate. The mass (and/or rotational moment of inertia) of the disc 100 may be sufficiently low that if it were to fail (for example break apart), then it would be contained within the engine. As such, a detection disc 100 may be classified as a non-critical part. The detection component 100 may be attached to a rotating shaft 30 of the gas turbine engine 10 using, for example, a mechanical fixing 32, as in the FIG. 6 example.

The detection component 100 is shown as having a crack initiation feature 50 near to its outer radial surface 56, which may be an example of a perimeter surface 56 as referred to elsewhere herein. However, it will be appreciated that one or more crack initiation features 50 could be provided in additional or alternative locations on the detection component 100. For example, a plurality of crack initiation features 50 may be provided at different angular positions around the detection component 100. As described elsewhere herein, each crack initiation feature 50 may be provided at different distances from the perimeter edge 56 to other crack initiation features 50.

The methods and/or apparatus described herein may be used to estimate the remaining serviceable life of any critical component in any engine, for example a turbofan, turbojet, turbo-prop or open-rotor gas turbine engine. Such a gas turbine engine may be for any use, for example for aircraft propulsion, industrial power generation, or marine use. Furthermore, the foregoing description of various aspects of the invention has been presented for purposes of illustration and description. It is not intended to be exhaustive or to limit the invention to the precise form disclosed. Various modifications and variations that may be apparent to a person of skill in the art are included within the scope of the invention as defined by the accompanying claims. Purely by way of non-limitative example, such variations may include the form and arrangement of detection components and/or crack initiation features.

I claim:

1. A gas turbine engine comprising:
   a critical rotating component that is critical to the operation of the gas turbine engine; and
   a detection component that is a different component than the critical rotating component, is provided with a crack initiation feature, and is remote from the critical rotating component, wherein:
   the detection component is located at a first position in the gas turbine engine, and
   the critical rotating component is located at a second position in the gas turbine engine that, as the gas turbine engine operates, experiences different temperatures and pressures than the first position, so that formation of a crack at the crack initiation feature is correlated to the remaining serviceable life of the critical rotating component.

2. A gas turbine engine according to claim 1, wherein:
   the detection component has a perimeter edge; and
   the crack extends from the crack initiation feature to the perimeter edge.

3. A gas turbine engine according to claim 1, wherein the detection component comprises a plurality of crack-initiation features.

4. A gas turbine engine according to claim 3, wherein:
   the detection component comprises a perimeter edge;
   each crack initiation feature is provided at a respective distance from the perimeter edge; and
   the respective distance of at least one crack initiation feature from the perimeter edge is different than the respective distance of another crack initiation feature from the perimeter edge.

5. A gas turbine engine according to claim 1, wherein the gas turbine engine defines a core flow path, and the detection component is a stationary component placed in the core flow path.

6. A gas turbine engine according to claim 1, wherein the detection component is a rotating component.

7. A gas turbine engine according to claim 1, wherein the detection component and the critical rotating component are manufactured using the same material.

8. A gas turbine engine according to claim 7, wherein the detection component and the critical rotating component are manufactured using the same forging.

9. A gas turbine engine according to claim 1, wherein the detection component and the critical rotating component are manufactured from different materials.

10. A gas turbine engine according to claim 1, comprising more than one detection component.

11. A gas turbine engine according to claim 1, wherein the critical rotating component is a rotating disc that carries rotating blades of the gas turbine engine.

12. A gas turbine engine according to claim 1, wherein the crack initiation feature is one of: a hole, a notch, a groove, a boss, a flange or a propagation slot.

13. A gas turbine engine according to claim 1, wherein the crack initiation feature does not extend entirely through the detection component.

* * * * *